Sept. 11, 1962                     C. E. MAKI                     3,054,097
                               CLIPPING INDICATOR
                             Filed Dec. 30, 1958
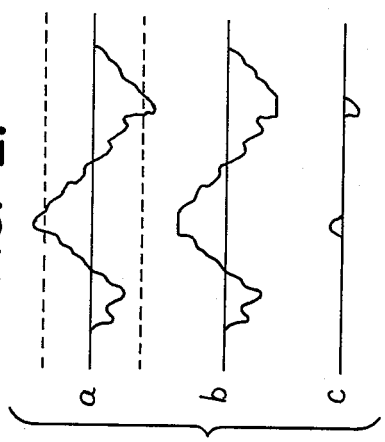
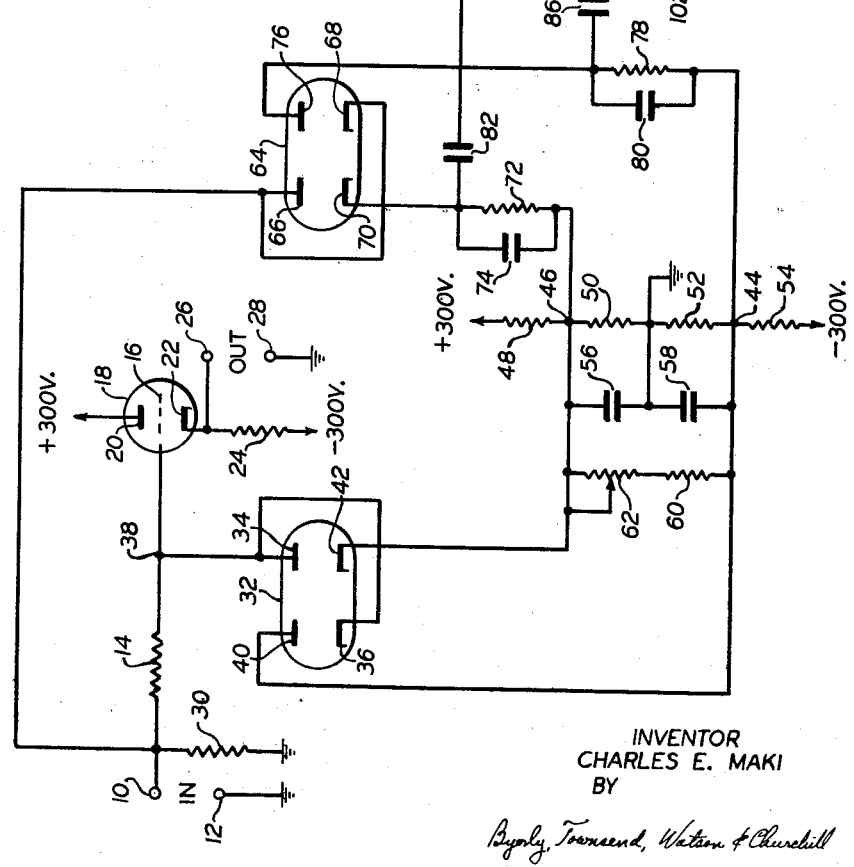
INVENTOR
CHARLES E. MAKI
BY
Byerly, Townsend, Watson & Churchill
ATTORNEYS United States Patent Office 3,054,097
Patented Sept. 11, 1962

3,054,097
CLIPPING INDICATOR
Charles E. Maki, Short Beach, Conn., assignor, by mesne assignments, to Textron Electronics, Inc.
Filed Dec. 30, 1958, Ser. No. 783,915
9 Claims. (Cl. 340—248)

The present invention relates to limiter circuits for limiting the maximum excursions of an alternating signal voltage passing therethrough to a predetermined value in at least one direction.

Circuits, commonly called limiters or clippers, find use today in a wide range of electronic equipment. In certain applications it may be desirable to provide some indication of the fact that limiting or clipping is actually taking place. The present invention is directed to the provision of an indicator for this purpose.

Although the invention, as described and claimed hereinafter, will be understood to have general application, it is particularly suited for use in conjunction with vibration testing equipment. A typical vibration testing system includes an electrodynamic vibration exciter, a power amplifier for supplying exciting voltage to the driving coil of the exciter, and a source of test signals which are fed to the power amplifier. Whether the test signals are of random nature or of a sinusoidal nature or the like, there is always present the possibility that an excessive signal will be applied through the power amplifier to the exciter causing damage to the latter. To avoid this, suitably biased limiters are placed in the circuit to restrict the signal to safe limits. Nevertheless, it is important, particularly during random motion testing, that the operator of the equipment be apprised of the fact that limiting is taking place and, therefore, that the mode of excitation of the exciter does not quite conform to the signal source.

The problem in providing indication of the limiting action is to do so without adversely affecting the degree and sharpness of the limiting action. It is also important that the additional equipment have little or no effect upon the bandwidth or frequency response of the limiter. At the same time, it is desirable, where bi-directional limiting is employed, to indicate whether it is the positive or negative peaks of the signal which are being clipped or limited.

Therefore, in accordance with the present invention there is provided in combination with a limiter circuit of the foregoing type, means for indicating when limiting is taking place, comprising a voltage amplitude discriminator having an input connected to receive the alternating signal voltage before it passes through the limiter circuit, means for biasing the amplitude discriminator to pass only those signals received at its input which exceed the predetermined value at which limiting takes place, and an indicator coupled to an output of the discriminator for indicating when the discriminator is passing signals.

As a further aspect of the invention the indicator comprises a glow tube having two electrodes, one of the electrodes being coupled to a point of fixed potential, the other of the electrodes being connected to one terminal of a capacitor whose other terminal is coupled to the output of the discriminator, and a relatively large resistance shunting the glow tube. In this manner a positive going signal supplied to the indicator will cause one electrode of the glow tube to glow while a negative going signal will cause the other electrode to glow. By arranging the discriminator to provide a positive going signal when one peak of the input signal is limited and a negative going signal when the opposite peak is limited, the glow tube will not only show that limiting is taking place but which peak is being limited.

The invention will be better understood after reading the following detailed description of a preferred embodiment of the invention with reference to the appended drawing in which:

FIGURE 1 represents a schematic circuit diagram of a limiter-indicator combination embodying the present invention, and FIG. 2 is a series of curves showing typical signal waveforms existing at different points in the circuit of FIGURE 1 during its operation.

Referring now to FIGURE 1, there is shown a pair of input terminals 10 and 12 with the latter connected to ground or other point of reference potential. A resistor 14 is connected between terminal 10 and the control grid 16 of a triode tube 18. The tube 18 has its anode 20 connected to a source of D.C. plate voltage, e.g. +300 volts, and its cathode 22 connected through a resistor 24 to —300 volts. A pair of output terminals 26 and 28 are shown connected across resistor 24. It will be understood that tube 18 is arranged to operate as a cathode follower. A return path is provided for the control grid 16 by a resistor 30 connected across the input terminals 10 and 12, as shown.

The limiter circuit includes the resistor 14 which acts as a series impedance for the input signals and a pair of unilateral conducting devices in the form of a dual diode 32. The anode 34 of one diode section is connected to the cathode 36 of the other diode section and both are connected at 38 to the junction between resistor 14 and control grid 16. The remaining anode 40 and cathode 42 are connected to taps 44 and 46, respectively negative and positive with respect to ground, on the biasing network consisting of resistors 48, 50, 52 and 54 in series, capacitors 56 and 58, resistor 60 and potentiometer or variable resistor 62. As shown the free end of resistor 48 is connected to the +300 volt supply while the free end of resistor 54 is connected to the —300 volt supply. The capacitors 56 and 58 shunt resistors 50 and 52, respectively, and the junction therebetween is connected to ground. The resistor 60 and variable resistor 62 are connected in series between points 44 and 46. It will be readily understood that adjusting resistor 62 will cause the potentials at points 44 and 46 to vary in equal amounts in opposite directions. There is thus obtained from the biasing network a source of bipolar biasing potential balanced with respect to ground throughout its range of adjustment. This arrangement provides for limiting at the same predetermined value above and below ground or reference potential. This is a desirable feature in vibration testing equipment. However, where this requirement for equal positive and negative limiting is not present, it should be obvious that separately adjustable sources of bias voltage can be employed.

As described thus far, we have a limiter circuit of generally known construction. If, for example, a signal such as shown by the solid line in curve a of FIGURE 2 is applied to the input terminals 10 and 12, it will appear at the output terminals 26 and 28 in the form illustrated in curve b of FIGURE 2. That is, it will appear as in curve b if the biasing potentials at points 44 and 46 of FIGURE 1 are set at the levels represented by the dashed lines in curve a of FIGURE 2.

To understand the operation further, the potential at point 38 in FIGURE 1 can rise in the positive direction until it exceeds the potential at point 46 at which time the right hand section of tube 32 will conduct. If resistor 14 is large compared with the forward impedance of the diode section, then further rise in potential of point 38 will be precluded. In a similar manner it can be shown that the left hand diode section of tube 32 prevents the potential at point 38 from going negative below the potential at point 44.

In order to ascertain when the input signal exceeds the preset biasing potentials and is limited, there is provided another dual diode 64. The anode 66 of one section is connected to the cathode 68 of the other section and both are connected to the input terminal 10. It is important to note that the connection of dual diode 64 to the input is separated from the point of connection 38 of the dual diode 32 by means of the resistor 14. The cathode 70 which is associated with anode 66 is connected through resistor 72 and parallel capacitor 74 to the point 46 on the biasing network. The anode 76, associated with cathode 68, is similarly connected through resistor 78 and parallel capacitor 80 to the point 44 on the biasing network. The junction between cathode 70 and resistor 72 is connected through a capacitor 82 to an output point 84 for the amplitude discriminator. In similar fashion the junction between anode 76 and resistor 78 is connected through a capacitor 86 to the output point 84. It should be evident from the foregoing that the discriminator and the limiter circuit are provided with a common biasing means or source.

The operation of the amplitude discriminator should now be apparent. Since the diode sections of the discriminator are biased to the same potentials as the diode sections of the limiter circuit, the discriminator diode sections will each commence to conduct at the same time as the similarly polarized section in the limiter. Whereas the limiter circuit passed all of the input signal below the limiting level, the discriminator passes only those signals which exceed such level. Therefore, referring to FIGURE 2, the output of the discriminator will be as shown in curve c if the conditions previously described for curves a and b remain the same. It should be noted that the discriminator provides an output signal of one polarity with respect to the point of reference potential when the positive peak of the input signal is limited and an output signal of the opposite polarity when the negative peak of the input signal is limited. The output of the discriminator appears at point 84.

It is to be understood that although a common biasing source is shown in the preferred embodiment illustrated in FIGURE 1, it is possible to employ separate biasing means for the discriminator so long as it can be adjusted to the same level as the biasing means for the limiter circuit. It should also be understood, as was described with reference to the limiter circuit, that the balanced biasing network may be replaced by an unbalanced arrangement. Moreover, only one diode section with its associated elements need be employed where only unidirectional indication is required.

The discriminator output at 84 is coupled through a two stage amplifier, to be described hereinafter, to a series arrangement of a capacitor 88 and glow tube 90. As shown, the glow tube has an electrode 92 connected to the +300 volt supply and an electrode 94 connected to the capacitor 88. A resistor 96 shunts the glow tube. The two stage amplifier consists of a dual tube 98 containing both a pentode and a triode section. A control electrode 100 of the pentode section is connected to the output 84 of the discriminator and through a grid leak resistor 102 to ground. Resistors 104 and 106 connected in series between the +300 volt supply and ground provide suitable operating potential for the screen grid 108 connected to their junction. The suppressor electrode 110 is internally connected to the cathode 112 which, in turn, is connected to ground through resistor 114. A plate resistor 116 connects the pentode section anode 118 to the +300 volt supply. Coupling capacitor 120 connects the anode 118 to the control grid 122 of the triode section and to ground through the grid leak resistor 124. A filter capacitor 126 also connects the anode 118 to ground. A resistor 128 joins the anode 130 of the triode section to the +300 volt supply, and the output of the amplifier is connected from the anode 130 to the capacitor 88. The cathode 132 is connected through resistor 134 to ground to complete the circuit.

The operation of the indicator circuit will now be explained. With no signal appearing at point 84 both the pentode and triode sections of the amplifier are arranged to operate somewhere in the vicinity of the mean of their operating range. By employing the typical circuit constants set forth below, the quiescent potential of the anode 130 will be about +150 volts. Due to the shunt resistor 96, capacitor 88 will be charged to 150 volts, the difference between +300 and +150. If a positive going signal or pulse appears at point 84 it will cause the anode 130 to rise in potential. Assuming a rise of the potential at anode 130 from +150 volts to +230 volts, the potential at electrode 94 of the glow tube due to the charge on the capacitor 88 will be initially +380 volts. That is electrode 94 will be 80 volts positive with respect to electrode 92 and the tube 90 will conduct with the glow concentrated about electrode 92. It should be understood that resistor 96 is relatively large and therefore does not result in appreciable discharge of capacitor 88 during the short duration of an input pulse.

Considering the occurrence of a negative going signal at point 84, it should be apparent that anode 130 will drop in potential. Since resistor 96 is large, the charge on capacitor 88 can not change immediately and, therefore, electrode 94 is driven negative with respect to electrode 92. If the breakdown voltage of the glow tube is exceeded, the tube will conduct the glow concentrated about electrode 94. With the arrangement as shown, glow of electrode 94 indicates negative limiting while glow of electrode 92 indicates positive limiting. By appropriate positioning of the glow tube in the display panel of the equipment it can be arranged that the uppermost electrode glows to indicate limiting of the positive peaks and vice versa.

In the foregoing discussion a figure of 80 volts was employed in connection with the operation of the glow tube. It should be understood, however, that the glow tube will conduct whenever its breakdown voltage is exceeded. In the preferred embodiment illustrated in FIGURE 1 a glow tube is employed which requires about 75 volts across its electrodes to start conduction. However, glow tubes with different breakdown voltages can be employed.

With the circuit constants set forth below the amplifier is caused to have a gain of about 4000. This means that a signal as small as 18.8 millivolts at point 84 will cause an indication. Therefore, for signals applied to the input terminals 10 and 12 of the limiter circuit within the normal operating range of the system, indication will occur when less than 1% and as little as 0.1% of such signal is removed by the limiter.

Solely for the purpose of illustration the following typical circuit constants are set forth. It will, of course, be well understood by those skilled in the art that many changes may be made both as to values, type of component and circuit configuration without departing from the spirit of the invention. In the tabulation the numbers first appearing in a particular column represent the reference numerals in FIGURE 1 while the numbers next appearing represent the resistance, capacitance or other designation as the case may be.

*Resistors*

| | |
|---|---|
| 14—100K ohms | 96—1M ohms |
| 30—470K ohms | 102—1M ohms |
| 48—100K ohms | 104—120K ohms |
| 50—22K ohms | 106—27K ohms |
| 52—22K ohms | 114—100 ohms |
| 54—100K ohms | 116—56K ohms |
| 60—2.7K ohms | 124—1M ohms |
| 62—20K ohms | 128—56K ohms |
| 72—68K ohms | 134—1K ohms |
| 78—68K ohms | |

Capacitor

| | |
|---|---|
| 56—50 mfd. | 86—.01 mfd. |
| 58—50 mfd. | 88—.047 mfd. |
| 74—.0068 mfd. | 120—.01 mfd. |
| 80—.0068 mfd. | 126—250 mmfd. |
| 82—.01 mfd. | |

Tubes

| | |
|---|---|
| 32—6H6 | 90—NE51 |
| 64—6H6 | 98—6AN8 |

All resistors are ½ watt except resistors 50 and 52 which are 1 watt and resistors 48 and 54 which are 2 watt. Since the cathode follower output stage forms no part of the present invention, it is deemed unnecessary to provide values therefor. Where tube types have been employed which incorporate more than one operative section within a single envelope, it will be evident that separate tubes or elements may be used.

What is claimed is:

1. In combination with a limiter circuit for limiting the maximum excursions of an alternating signal voltage passing therethrough to a predetermined value in at least one direction, means for indicating when such limiting action is taken place, said means comprising a voltage amplitude discriminator having an input coupled to a point common to an input for said limiter circuit to receive said alternating signal voltage before it passes through the limiter circuit, means for applying a normally fixed biasing voltage to said amplitude discriminator for causing it to pass only those signals and all of those signals received at said discriminator input which exceed said predetermined value in the limiting direction, and an indicator coupled to an output of said discriminator for indicating when the discriminator is passing signals.

2. The combination according to claim 1, wherein the indicator comprises a glow tube having two electrodes, one of said electrodes being coupled to a point of fixed potential, the other of said electrodes being connected to one terminal of a capacitor whose other terminal is coupled to said output of the discriminator, and a relatively large resistance shunting said glow tube.

3. In combination with a limiter circuit for limiting the maximum excursions of an alternating signal voltage passing therethrough to predetermined values above and below a reference potential, means for indicating when such limiting action is taking place and in which direction, said means comprising two voltage amplitude discriminators each having an input coupled to a point common to an input for said limiter circuit to receive said alternating signal voltage before it passes through the limiter circuit, one of said discriminators being for signals above and the other of said discriminators being for signals below said reference potential, means for applying normally fixed biasing voltages to said discriminators for causing them to pass only those signals and all of those signals received at the respective discriminator inputs which exceed said predetermined values respectively above or below the reference potential, and a single indicator device capable of providing at least two distinguishable indications coupled to an output of each of said discriminators for providing one indication when one discriminator is passing signals and a different indication when the other discriminator is passing signals.

4. The combination according to claim 3 wherein the indicator device comprises a glow tube having two electrodes, one of said electrodes being coupled to a point of fixed potential, the other of said electrodes being connected to one terminal of a capacitor whose other terminal is coupled to said outputs of the discriminators, and a relatively large resistance shunting said glow tube, said discriminators being arranged to pass signals of opposite polarity such that one or the other of said electrodes will glow depending upon which discriminator is passing a signal.

5. In combination with a limiter circuit for limiting the maximum excursions of an alternating signal voltage passing therethrough to a predetermined value in at least one direction, means for indicating when such limiting action is taking place, said means comprising a voltage amplitude discriminator having an input coupled to a point common to an input for said limiter circuit to receive said alternating signal voltage before it passes through the limiter circuit, common means for biasing both said limiter circuit and said amplitude discriminator such that the latter passes only those signals and all of those signals received at its input which exceed the value at which limiting occurs in the limiting circuit, and an indicator coupled to an output of said discriminator for indicating when the discriminator is passing signals.

6. In combination with a limiter circuit for limiting the maximum excursions of an alternating signal voltage passing therethrough to predetermined values above and below a reference potential, means for indicating when such limiting action is taking place and in which direction, said means comprising two voltage amplitude discriminators each having an input coupled to a point common to an input for said limiter circuit to receive said alternating signal voltage before it passes through the limiter circuit, one of said discriminators being for signals above and the other of said discriminators being for signals below said reference potential, common means for biasing both said limiter circuit and said two discriminators such that the latter pass only those signals and all of those signals received at their inputs which exceed the value at which limiting occurs in the limiting circuit respectively above or below the reference potential, and indicator means coupled to an output of each of said discriminators for providing one indication when one discriminator is passing signals and a different indication when the other discriminator is passing signals.

7. The combination according to claim 6, wherein the limiter circuit comprises a pair of reversely connected unilateral conducting devices coupled so as to provide a shunt for a signal passing through the limiter whenever the devices conduct, and an impedance element coupled between the limiter input and said unilateral conducting devices so as to provide a series impedance for a signal passing through the limiter, said devices being independently coupled to said common biasing means to conduct when said signal exceeds said predetermined values respectively above or below the reference potential.

8. The combination according to claim 6, wherein said amplitude discriminators each comprise a unilateral conducting device having two electrodes, one of said electrodes being connected to said input of the respective discriminator, a capacitor connected between the other electrode of said device and said output of the respective discriminator, and an impedance element connecting the junction of said capacitor and said other electrode to said common means for biasing, the unilateral conducting devices in the two discriminators being reversely connected such that one passes positive going signals while the other passes negative going signals.

9. In combination with a limiter circuit for limiting the maximum excursions of an alternating signal voltage passing therethrough to predetermined values above and below a reference potential, means for indicating when such limiting action is taking place and in which direction, said means comprising voltage amplitude discriminator means having an input coupled to a point common to an input for said limiter circuit to receive said alternating signal voltage before it passes through the limiter circuit, means for biasing said discriminator means normally at a fixed level for causing it to pass only those signals and all of those signals received at said discriminator input which exceed said predetermined values respectively above or below the reference potential, and indicator means capable of providing at least two distinguishable indications coupled to an output of said discriminator means for providing one indication when the discriminator means is passing signals which have exceeded said predetermined value above the reference potential and a different indication when the discriminator means is passing signals which have exceeded said predetermined value below the reference potential.

References Cited in the file of this patent

UNITED STATES PATENTS

| | | |
|---|---|---|
| 1,869,484 | Knoop | Aug. 2, 1932 |
| 2,171,671 | Percival | Sept. 5, 1939 |
| 2,624,789 | Dean | Jan. 6, 1953 |
| 2,805,338 | Siebenberg | Sept. 3, 1957 |
| 2,941,193 | Patton | June 14, 1960 |